US006932355B1

(12) United States Patent  (10) Patent No.: US 6,932,355 B1
Hjertholm  (45) Date of Patent: Aug. 23, 2005

(54) SEALING ARRANGEMENT

(75) Inventor: Ole Hjertholm, Lepsøy (NO)

(73) Assignee: Den Norske Metallpakningsfabrikk AS, Bergen (NO)

( * ) Notice: Subject to any disclaimer, the term of this patent is extended or adjusted under 35 U.S.C. 154(b) by 0 days.

(21) Appl. No.: 09/889,755

(22) PCT Filed: Jan. 26, 2000

(86) PCT No.: PCT/NO00/00017

§ 371 (c)(1),
(2), (4) Date: Oct. 10, 2001

(87) PCT Pub. No.: WO00/47925

PCT Pub. Date: Aug. 17, 2000

(30) Foreign Application Priority Data

Jan. 28, 1999 (NO) ..................................... 990388

(51) Int. Cl.⁷ ............................................... F16L 19/06
(52) U.S. Cl. ..................... 277/614; 277/626; 277/644; 277/905; 285/334.2; 285/341
(58) Field of Search ................................ 277/339, 340, 277/606, 614, 626, 644, 905; 285/364, 341, 285/330, 332, 332.1, 334.2

(56) References Cited

U.S. PATENT DOCUMENTS

| 2,310,944 | A | * | 2/1943 | Douglass | .................. | 285/334.2 |
| 2,439,161 | A | * | 4/1948 | Du Bois | ..................... | 248/672 |
| 2,766,998 | A | * | 10/1956 | Watts et al. | ............. | 285/334.2 |
| 2,775,471 | A | * | 12/1956 | Douglass | .................. | 285/332.3 |

(Continued)

FOREIGN PATENT DOCUMENTS

| AT | 392143 | 1/1991 |
| DE | 3723386 | 1/1989 |
| EP | 0222027 | 5/1987 |
| NO | 178388 | 12/1995 |
| NO | 303150 | 6/1998 |
| WO | 9318331 | 9/1993 |

*Primary Examiner*—Alison K. Pickard
(74) *Attorney, Agent, or Firm*—Ladas & Parry LLP

(57) ABSTRACT

There is referred to a sealing arrangement (10, 10') comprising two armature members (11, 12), which are adapted to receive a sealing ring (13, 13') between them for sealing off a joint between the armature members (11, 12), and a clamping device (30), which during mounting is adapted to clamp the armature members (11, 12) against each other in a direction towards the intermediate sealing ring (13, 13'), where the sealing ring (13, 13') has a substantially T-shaped annular cross-section, with a stem (14) extending radially outwards and with a sealing face (15a, 15b) facing radially outwards in each of two sealing wings (15, 16) projecting axially outwards in opposite directions from stem (14) of the T-shape, the sealing wings (15, 16) having mutually equivalent forms and equivalent conical sealing faces (15a, 16a) for forming abutments against their respective conical support faces (21, 25) of each of the armature members (11, 12). The sealing arrangement is characterised in that the sealing wings (15, 16) of the sealing ring (13, 13') are elastically deformable, and that the sealing ring (13, 13') is supported, during use, in a radial direction in the armature members (11, 12) via three axially separated, annular faces (21, 22, 25) facing radially correspondingly, the sealing wings (15, 16) forming, during use, both slidable seals and slidable thrusts against a respective conical, combined sealing and slide face (21, 25) of each of the armature members (11, 12), while stem (14) of the sealing ring (13, 13') has, during use, a certain degree of fit in an axial direction and is adapted to be supported with a slide fit against an associated armature member via a middle, combined support and slide face (22) at the outer end of the stem (14) of the T-shape.

18 Claims, 10 Drawing Sheets

U.S. PATENT DOCUMENTS

| | | | | |
|---|---|---|---|---|
| 3,141,685 A | * | 7/1964 | Watts | 285/93 |
| 3,307,862 A | * | 3/1967 | Brown | 285/364 |
| 3,325,176 A | * | 6/1967 | Latham et al. | 277/614 |
| 3,403,931 A | * | 10/1968 | Crain et al. | 285/334.2 |
| 3,404,902 A | * | 10/1968 | Latham et al. | 285/14 |
| 3,848,421 A | * | 11/1974 | O'Brien et al. | 405/170 |
| 3,877,730 A | * | 4/1975 | Frantz | 285/15 |
| 4,474,381 A | * | 10/1984 | Wilkins et al. | 285/14 |
| 4,480,861 A | * | 11/1984 | Cann, Jr. | 285/334.2 |
| 4,635,967 A | * | 1/1987 | Stephenson | 285/45 |
| 4,919,456 A | * | 4/1990 | Wong | 285/39 |
| 4,953,580 A | * | 9/1990 | Schabert et al. | 285/23 |
| 5,016,920 A | * | 5/1991 | Anderson | 285/39 |
| 5,103,915 A | * | 4/1992 | Sweeney et al. | 166/379 |
| 5,466,018 A | * | 11/1995 | Stobbart | 285/334.2 |
| 5,570,911 A | | 11/1996 | Galle | 285/364 |
| RE35,533 E | * | 6/1997 | Adamek et al. | 285/23 |

\* cited by examiner

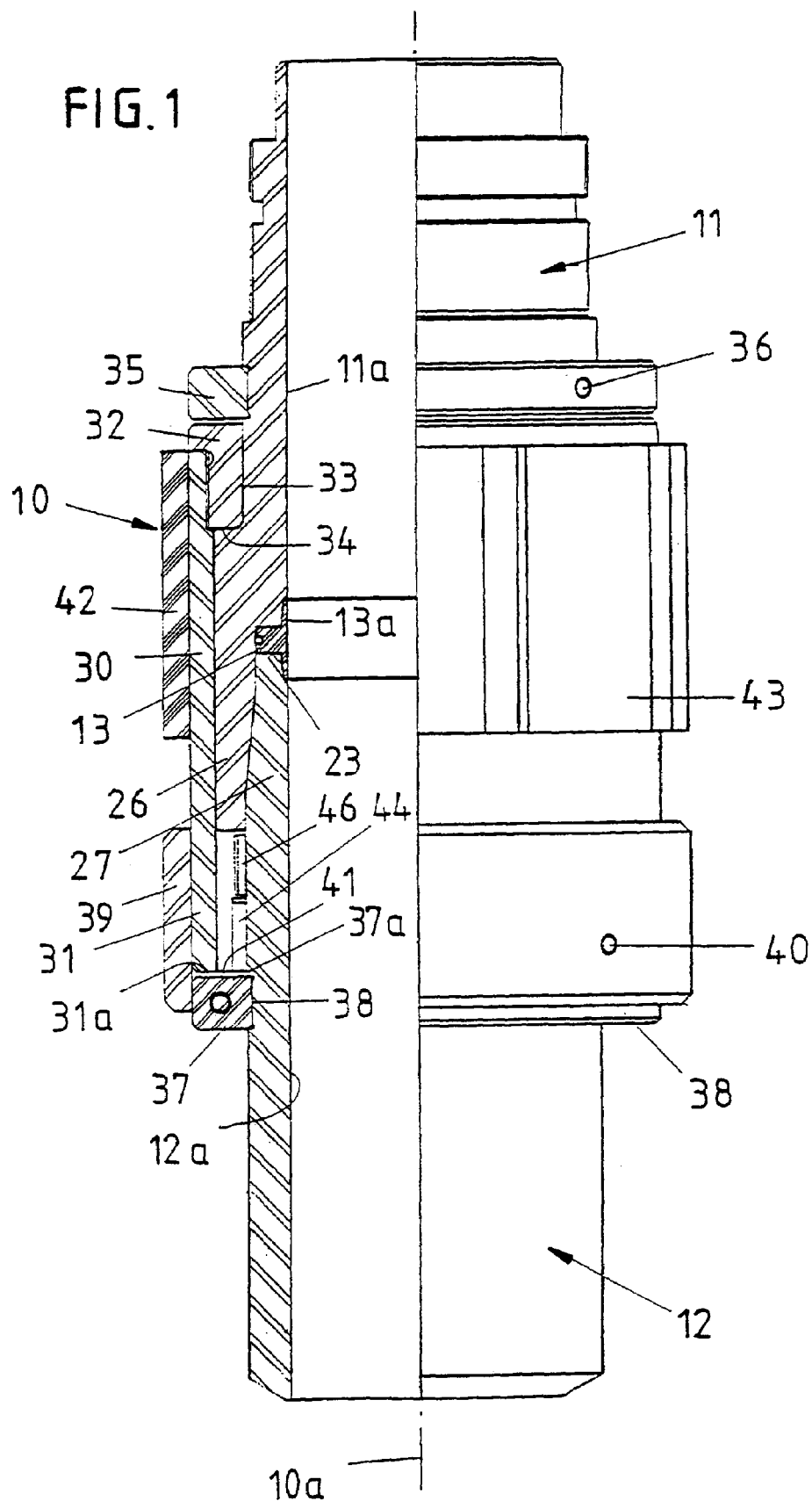

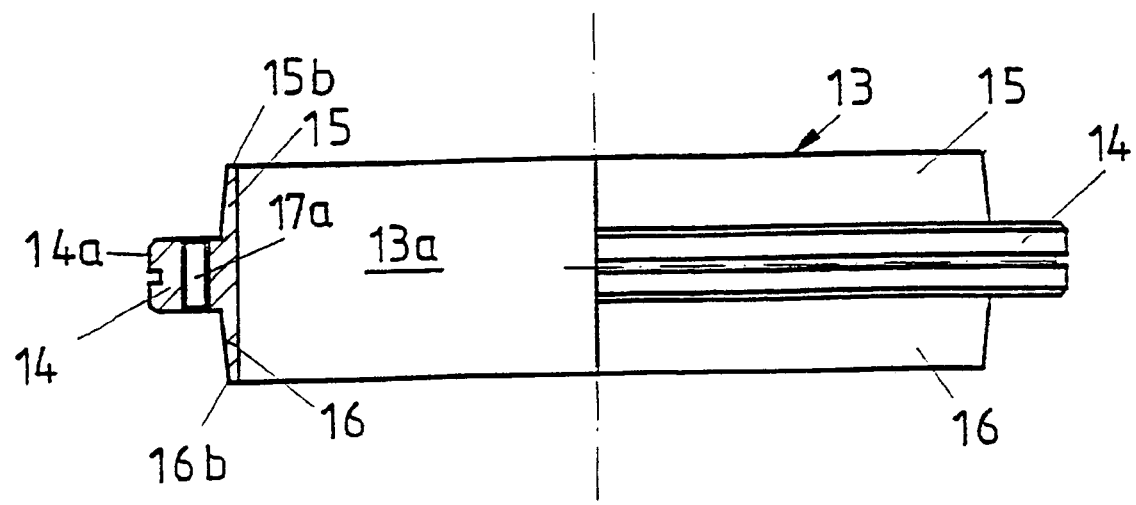
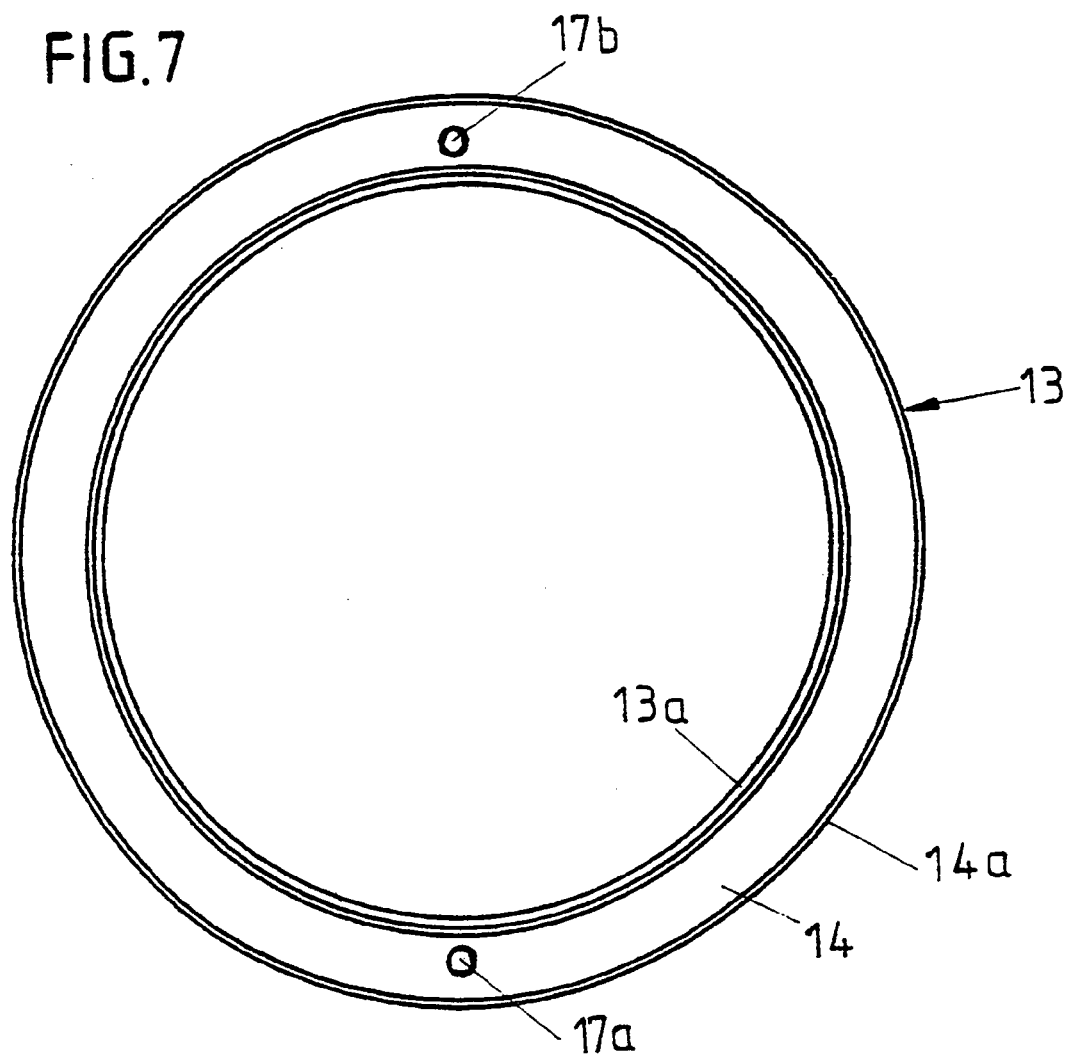

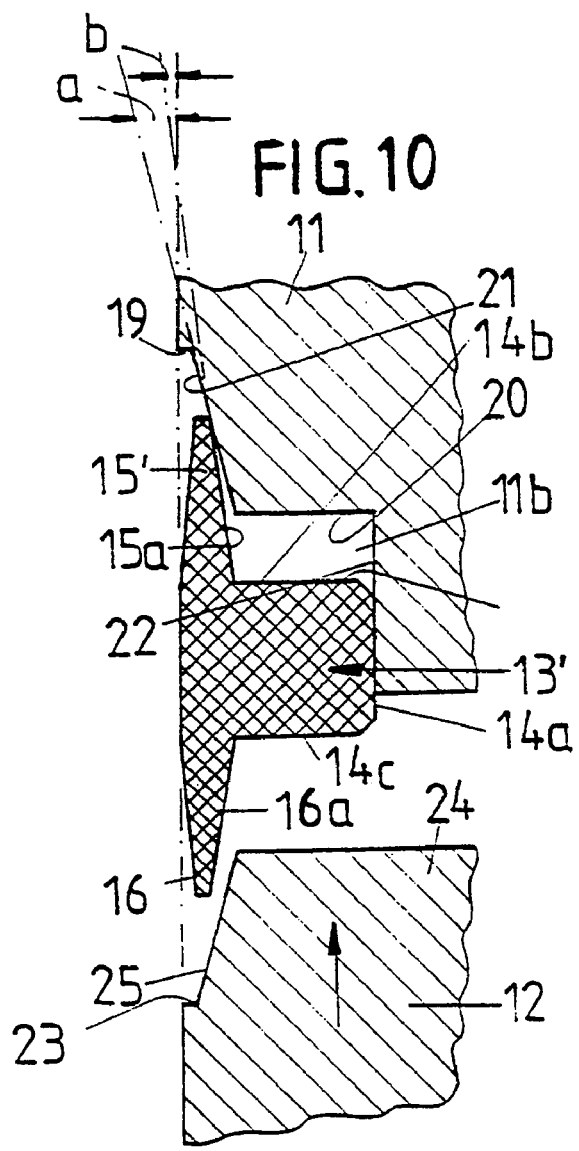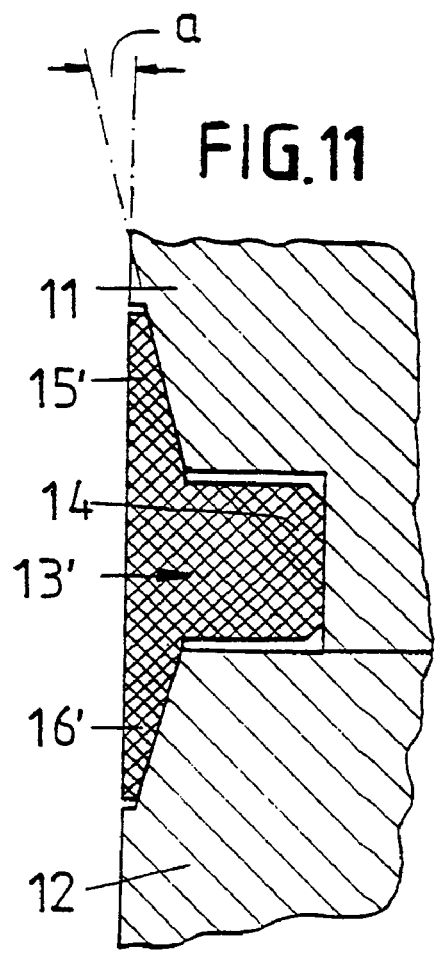

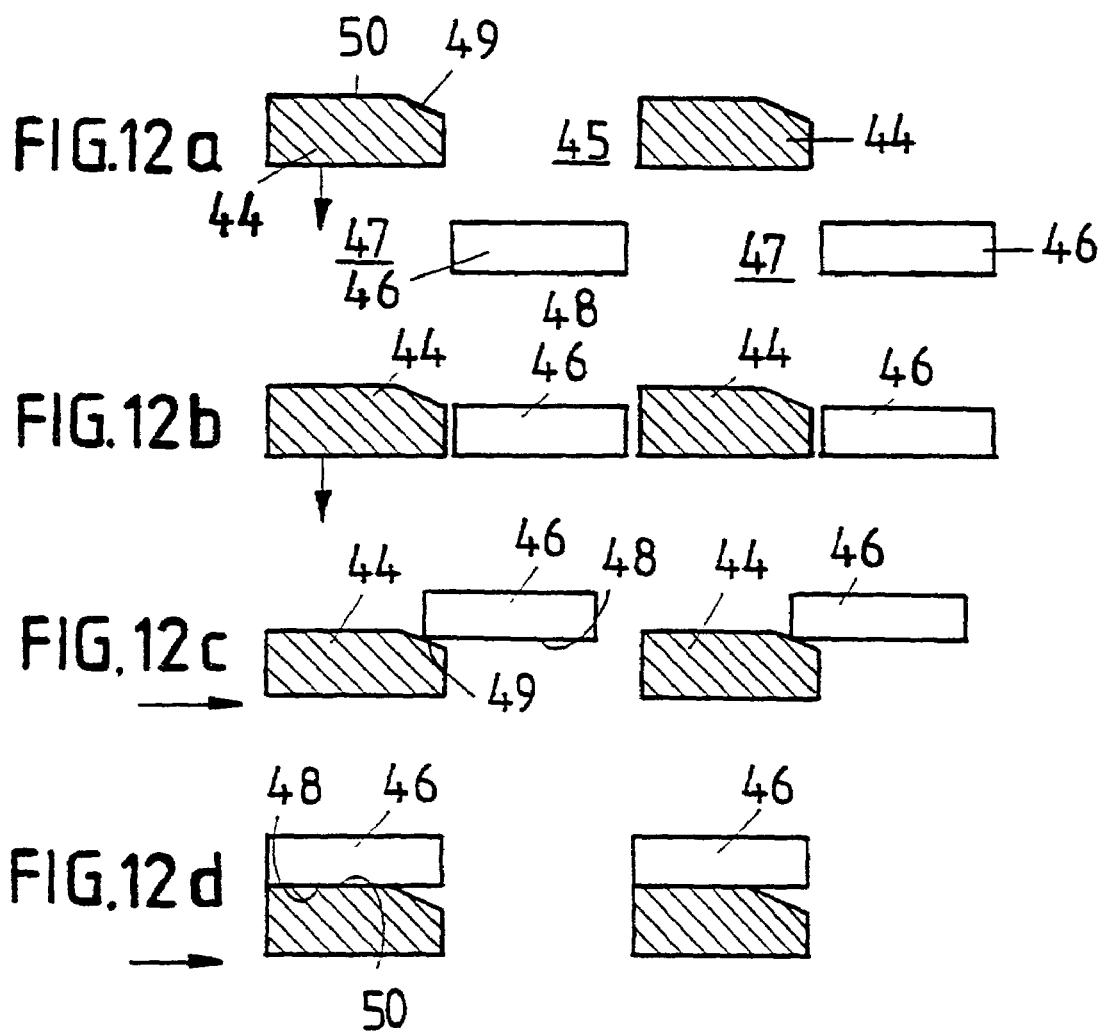

SEALING ARRANGEMENT

BACKGROUND OF THE INVENTION

Present invention relates to a sealing arrangement comprising two separate armature members and a sealing ring interposed therebetween and a clamping device for clamping the armature members against each other causing the intermediate sealing ring to be loaded with a sealing force, said sealing ring being made of metal or similar material and having a substantially T-shaped annular cross-section, said T-shape being provided with two in opposite axial direction extending sealing wings, each with an radially outwards facing sealing face and therebetween a central, rather rigid stem extending radially outwards and being provided with a combined gliding and support face to be supported against a counter face in the sealing arrangement, each of said sealing faces being conically shaped to be supported against a radially surrounding, correspondingly conically shaped gliding and support face in a corresponding armature member, each of said conical support faces of said armature members extends under a first, smallest cone angle, whereas each of said said sealing wings extends under a second, greatest cone angle, prior to mounting, and after mounting extends under said first cone angle to form a tight sealing abutment against its corresponding support face.

The present invention finds its application in a series of different areas of use, that is to say during moderate working conditions as well as during extreme working conditions.

The expression " armature members" is employed herein for indicating that there are under discussion various types of "armature". In the present embodiment however the invention is illustrated in connection with an armature in the of a pipe coupling.

During moderate working conditions there can be employed for example a sealing ring of rigid plastic or another suitable material, while under extreme working conditions, for example in a pipe coupling, there can be employed according to the illustrated embodiment a metallic sealing ring.

It is generally known to employ a metallic sealing ring of T-shaped annular cross-section in an intermediate space between two opposite coupling pieces of a pipe coupling. Such a pipe coupling can be used for example when high pressure and tensile loadings occur axially in the pipe coupling and when at the same time extreme internal medium pressure can occur in the joint between the coupling pieces/the armature members. In what follows "coupling piece "will be indicated as armature member.

An example of such a known solution is shown in NO 178 388. Therein it is shown that the stem of the T-shape is clamped together via opposite side faces, in the axial direction of the pipe coupling, at the same time as laterally directed sealing flaps of the T-shape are clamped each via its cone face in the axial direction and radial direction of the pipe coupling for sealing abutment against a respective cone face of a stopper of a respective armature member.

An other example of such known solution is shown in AU 392 143. It is suggested therein that the sealing faces of the sealing wings of the sealing ring has a cone angle of 1°–2° steeper than that of the support face of the armature members. This will or may result in permanent deformation of the sealing ring in cases wherein the sealing faces are loaded with extreme pressure load. In practice this will involve that the sealing ring during mounting or hence during use is over-loaded and destroyed by exceeding the yield point of the metallic sealing ring and the latter is to be shifted. This will involve a time consuming and expensive shifting operation, especially in oil and gass drilling operations.

It is to to be noted, with reference to AU 392 143, that said sealing faces are solely located at the outer ends of the sealing wings, i.e. at a considerable distance from the sealing ring stem. By spacing the conic faces of the armature members from the conic faces of the inner portion of the sealing wing over a considerable axial distance the sealing face area is clearly restricted and an intended high moment force is achieved in the sealing face area. Such high sealing forces, when occurring as instantaneous peak pressures in gass or oil drilling pipes, may quite often cause permanent deformation of the sealing ring and a following leaking that will require shifting of a destroyed sealing ring.

By clamping together the stem of the T-shape in the axial direction the sealing ring is locked in place in the intended use position, that is to say in an intended immovable use position. At the same time by arrangement of the sealing flaps in a sealing abutment against the armature members, the seal is precisely set in the immovable use position. Consequently the metallic sealing ring becomes locked in an immovable engagement with the respective armature members.

According to NO 178 388 the metallic sealing ring becomes subjected, during mounting, to an extremely high clamping pressure, so that the sealing ring becomes permanently deformed, that is to say by means of a clamping pressure which involves exceeding the yield strength of the metal. The metallic sealing ring becomes permanently deformed both in an axial and in a radial direction. During use in a pipe conduit any relative movement between the sealing ring and the adjacent armature members is consequently prevented, independently of which tensile or pressure forces which have an effect axially through the pipe coupling. In practice the function of the sealing ring will depend totally upon the sealing ring and the armature members being held the whole time in permanent clamping engagement with each other under a continued high clamping pressure. This function is ensured as long as the extremely high clamping pressure is maintained. On relief of the extremely high clamping pressure which is applied on the pipe coupling the sealing function is made inactive. This involves, during use, on extreme loads occurring axially though the armature members, in combination with varying extremely high internal medium pressures and/or significant temperature variations in the coupling pieces and the sealing ring, a breakage of the seal arising, with leakages following from this and also the need for repair. The repair which makes it necessary to scrap the permanently deformed sealing ring, and possible damage, which is imposed on the coupling pieces, is rather time-consuming and rather expensive. This is particularly the case on use in a pipe conduit which is utilised in a drilling operation and/or in connection with transportation of gas/oil products from wells in the ocean.

In NO 303 150 a sealing arrangement is proposed for the afore-mentioned purpose, that is to say for use in a pipe conduit with associated pipe coupling during extreme conditions of use. In the sealing arrangement the aforementioned metallic sealing ring is omitted. Instead two armature members (coupling pieces) are employed, which form a direct sealing abutment with each other in a mutual sliding abutment via a conical sealing face of an elastically yielding ring portion of the one armature member. There is employed a conical supporting surface of a robust supporting portion of the other armature member. As a result of the slidable sealing engagement between the armature members, in combination with the elastically yielding sealing portion of the one armature member it is possible to ensure an effective sealing engagement during use of the pipe coupling.

This sealing effect can be achieved, even when extreme axial tensile and pressure forces occur between the armature members and even when significant temperature variations and extreme pressure variations occur in the pressure medium which passes through the pipe coupling. Normally the sealing arrangement can be reemployed after use, that is to say after the introductory applied clamping force is relieved.

However, also according to NO 303 150, there are employed very high clamping pressures (up towards the yield point of the metallic sealing portion of the coupling) during mounting, that is to say during the joining of the armature members, and also during the use itself of the pipe coupling. This is caused by the relatively rigid and relatively thick-walled sealing portion of the one coupling piece, which is to be subjected to elastic deformation.

By virtue of the different loadings, which occur in the pipe coupling during use, in combination with the slidable seal which is obtained between the armature members, there are employed in the known solution particularly high clamping pressures, that is to say as mentioned clamping pressures of an order of magnitude almost up to the yield point of the metallic material of the armature member having the elastically yielding sealing portion.

In the known solution the clamping pressure, that is to say the applied preliminary pressure, shall during use be able to compensate for occurring tensile forces and relative axial movements following from this between the sealing face and the stop face of the two armature members, at the same as an effective sealing off is ensured between the armature members.

SUMMARY OF THE INVENTION

On possibly exceeding the yield point of the material of the armature member/members, the sealing function between the armature members fails. The result is that at least the armature member with the elastically yielding sealing portion, must be replaced.

According to the invention the aim is a sealing arrangement, which inter alia can be employed for the same or similar purposes, as according to NO 303 150, and which can replace with advantage said known solution, based on an axially slidable sealing engagement.

According to the invention the aim is to utilise a separate, elastically yielding sealing ring, instead of an elastically yielding sealing portion of the one armature member according to NO 303 150.

In extreme cases the aim is to be able to replace only the sealing ring, in a manner known per se, on need, instead of having to replace the whole armature member with elastically yielding sealing portion, as is necessary according to NO 303 150.

In addition the aim is to be independent of the extremely high clamping pressures according to the known solution during mounting of the sealing elements and during use of the pipe coupling. This involves being able to achieve an effective sealing off of a substantially lower clamping pressure region based on an elastic adjustment between sealing abutment and various pressure and tensile loadings which occur axially though the armature members.

A further aim is to be able to employ a substantially simpler mounting technique according to the invention than according to the known solution, in combination with said substantially lower clamping pressure against the sealing ring during use, than that which is a prerequisite according to NO 303 150.

However the solution according to the invention is not limited to such use, as indicated in NO 303 150, but can as mentioned above find application for a series of various other purposes. The sealing arrangement according to the invention can for example find application in areas where there is a need for substantially simpler sealing arrangements than proposed in said patent, but where in addition it is favourable having a slidable sealing engagement between sealing ring and armature members.

The sealing arrangement according to the invention is characterised in that each sealing face of said sealing ring has the same axial extension as that of the associated sealing wing, and each sealing face has a continuous, rectilinear extension in axial direction of the sealing wing, and each sealing wing is tapering in axial direction from the stem and is elastically deformable in relation to the stem in order to secure a controlled elastic deformation of the sealing wing.

According to the invention it is possible to obtain considerable advantages by allowing the sealing wings of the sealing ring to be deformed elastically in a controlled manner during mounting of the sealing ring as well as in use of the sealing ring under varying working conditions.

One advantage is that it is possible to operate the sealing arrangement in a controlled manner to keep occurring forces well beyond the yield point of the metallic sealing ring material.

An other advantage is especially achieved by allowing the sealing faces of the elastically deformable sealing ring to slide in a controlled manner along its associated support faces in the armature members. This is especially the case during existing high extern or intern temperature variations and/or under occurring extreme peak load situations within an associated gass or oil piping. By combining a controlled elastic deformation of the sealing wings and a controlled sliding support of the sealing ring in all of its counter faces it is in a surprisingly simple manner possible to operate occuring loads in a controlled manner beyond the yield point of the metallic sealing ring material.

In DE 37 23 386 it is suggested to provide a cavity in one of the armature members to insert the whole of the sealing ring therein. The radial support face of the sealing ring is supported in radial direction by an annular spring located in a radial groove in said cavity. Such suggestion will prevent a controlled gliding support of the sealing ring in said cavity.

This problem is solved according to the present invention in that said counter face extends continuously in axial direction and solely in one of the armature members to support the support face of the stem in a continous gliding support directly against said counter face.

By means of the middle support and slide face, which is arranged in a sealing ring stem, which preferably is rigid and shape stable, it is possible during use for the sealing ring to move unhindered relative to each of the armature members, inter alia for equalising of, that is to say equally distributing of occurring sealing pressures on each of the sealing wings. This is the case even under extreme use conditions (extreme medium pressures in the coupling in combination with extreme loadings on the armature members).

By means of the elastically deformable sealing wings of the sealing ring in combination with said shape-stable and rigid stem, it is possible, by sliding movement of the sealing ring relative to the armature members, to ensure effective sealing off in various axially displaced sealing positions, according to need.

By means of the rigid stem an effective bracing of the middle main portion of the sealing ring can be ensured. By means of relatively slender sealing wings an elastic deformation of the sealing wings can be achieved in a relatively simple manner, even if the sealing ring is made of rather rigid material, such as metal, glass or rigid plastic.

According to the invention it is preferred to produce the sealing ring of the same material as the armature members, for example of metal, such as aluminium, or of a material, which has the same or substantially the same coefficient of thermal expansion as the material of the armature members. By this it is possible to subject the material of the armature members and the material of the sealing ring to similar or as far as possible similar expansion or contraction at varying temperature and pressure conditions.

BRIEF DESCRIPTION OF THE DRAWINGS

Further features of the sealing arrangement according to the invention will be evident from the following description with regards to the accompanying drawings, in which:

FIG. 1 shows a sealing arrangement according to the invention utilised in connection with an armature in the form of a pipe coupling, illustrated partly in side view and partly in longitudinal section.

FIG. 6 shows a sealing ring, illustrated partly in side view and partly in longitudinal view.

FIGS. 7 and 8 show the sealing ring according to FIG. 6 in plan view and in perspective view respectively.

FIG. 10 illustrates the sealing arrangement according to the invention before joining together.

FIG. 11 illustrates the sealing arrangement according to the invention after joining together.

FIGS. 12a–12d show schematically four different stages of an axial clamping together of the armature members, illustrated with a pair of clamping means of the one armature member and a pair of clamping means of the clamping member of the clamping device.

Figure 1A:
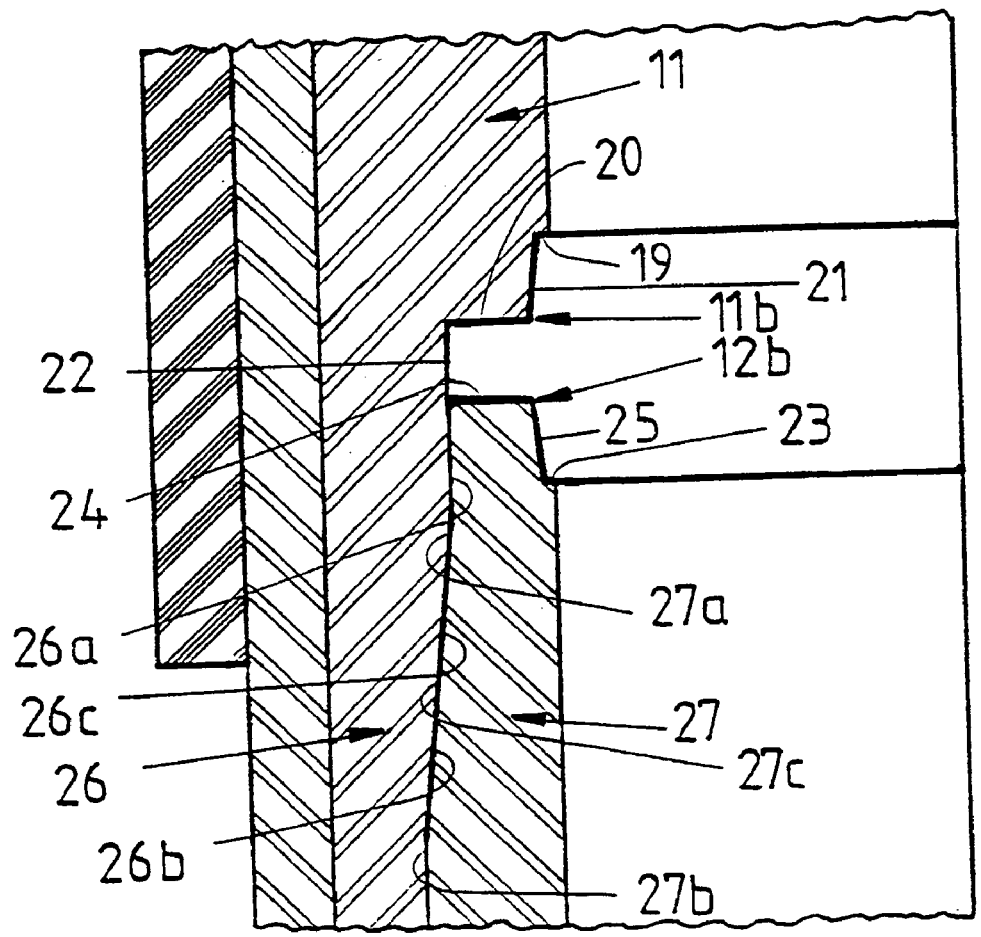
FIG. 1a shows a section of two armature members in a joined position.

A sealing arrangement 10 according to the invention comprises, as is shown in FIG. 1, a first armature member 11 and a second armature member 12 plus an annular sealing ring 13. In addition a combined clamping and locking device 30 is employed in the sealing arrangement 10, which will be described in more detail further below in the description.

The sealing arrangement 10 according to the invention can be employed for different types of armatures, such as pipes, hoses, conduits, containers, cover members, and the like.

In a first embodiment, according to FIGS. 1–9, the sealing arrangement 10 is shown in connection with an armature, which is in the form of a pipe coupling. Instead of designating the members as "pipe members ", there is employed herein, as mentioned above, the general term 'armature members', in order to stress that other members can be employed instead of the pipe members or coupling pieces illustrated herein.

DETAILED DESCRIPTION

The sealing arrangement 10 can be utilised for arbitrary sealing purposes, with different requirements for sealing pressures and with different requirements for variations in sealing pressures and different requirements for variations in temperature conditions.

The sealing arrangement 10 is utilisable in principle for sealing off internally for preventing leakage of medium from within and outwards, as well as for external sealing for preventing leakage of medium from outside and inwards. In the illustrated embodiment however there is only shown a construction for internal sealing.

If desired there can be employed a first, radially inner sealing ring against internal excess pressure and a second, radial outer sealing ring against external excess pressure, each sealing ring being based on the sealing arrangement according to the present invention.

The sealing arrangement 10 can be specifically utilised for equipment which can be exposed to significant variations in internal and external medium pressure and/or significant variations in external and internal temperature conditions. The solution for example shall be able to be utilised under temperature variations of 40–50° C. or more. In this connection it is considered specifically for use in desert regions with extremely high day temperatures and rather low night temperatures. Furthermore it is considered for use in arctic or similar cold regions of application, where at certain times of the year there can occur extremely low temperatures.

The T-shaped, relatively rigid and relatively shape-stable sealing ring 13 of the sealing arrangement can be made of largely arbitrary, relatively rigid material, such as metal, plastic, glass or the like. Preferably the sealing ring 13 is made of the same material as the armature members 11, 12 or of a material having a similar or largely corresponding coefficient of heat expansion.

The said four members 11, 12, 13, 30 have a common longitudinal axis 10a. Three members 11–13 each have their mutually flush, cylindrical inner faces 11a, 12a, 13a. The locking device 30 is arranged radially just outside the armature members 11, 12 in a region where these overlap each other.

The sealing ring 13 is, as shown in FIG. 1 in a condition ready for use, received in a downwardly opening layer 11b (see FIG. 1a) of the one armature member 11. The layer 11b is defined between a first, radially extending, axially facing, innermost guide face 19 and a second, radially extending, axially facing, outermost guide surface 20 and an intermediate, stop-forming conical face 21 plus a radially facing cylindrical, outermost lying support face 22. The conical face 21 passes at a cone angle a relative to the longitudinal axis 10a of the sealing arrangement 10.

The armature member 12 is, as shown in FIG. 1a, provided with an upwardly opening layer 12b, which comprises a first, radially extending, axially facing, innermost guide surface 23 and a second, radially extending, axially facing outermost guide surface 24 and an intermediate, stop-forming cone face 25, which extends equivalently at a cone angle a relative to the longitudinal axis 10a.

As shown in FIGS. 1 and 1a the armature member 11 has a shirt portion 26, which overlaps a peripheral portion 27 of the armature member 12 in a region axially within end face 23 of the armature member 12.

The armature members 11 and 12 are provided with two pairs of equivalent cylindrical guide faces 26a, 27a and 26b, 27b having mutually adapted degrees of fit. The armature members 11, 12 form mutually supporting abutments via conical stop faces 26c, 27c of a transition portion between the pairs of the guide faces 26a, 27a; 26b, 27b. In the pushed together condition the armature members 11, 12 are closed off having mutual support in the axial direction via the stop faces 26c, 27c. After mounting by means of the clamping device 30 the armature members 11, 12 are closed off in the opposite axial direction.

Figure 2:
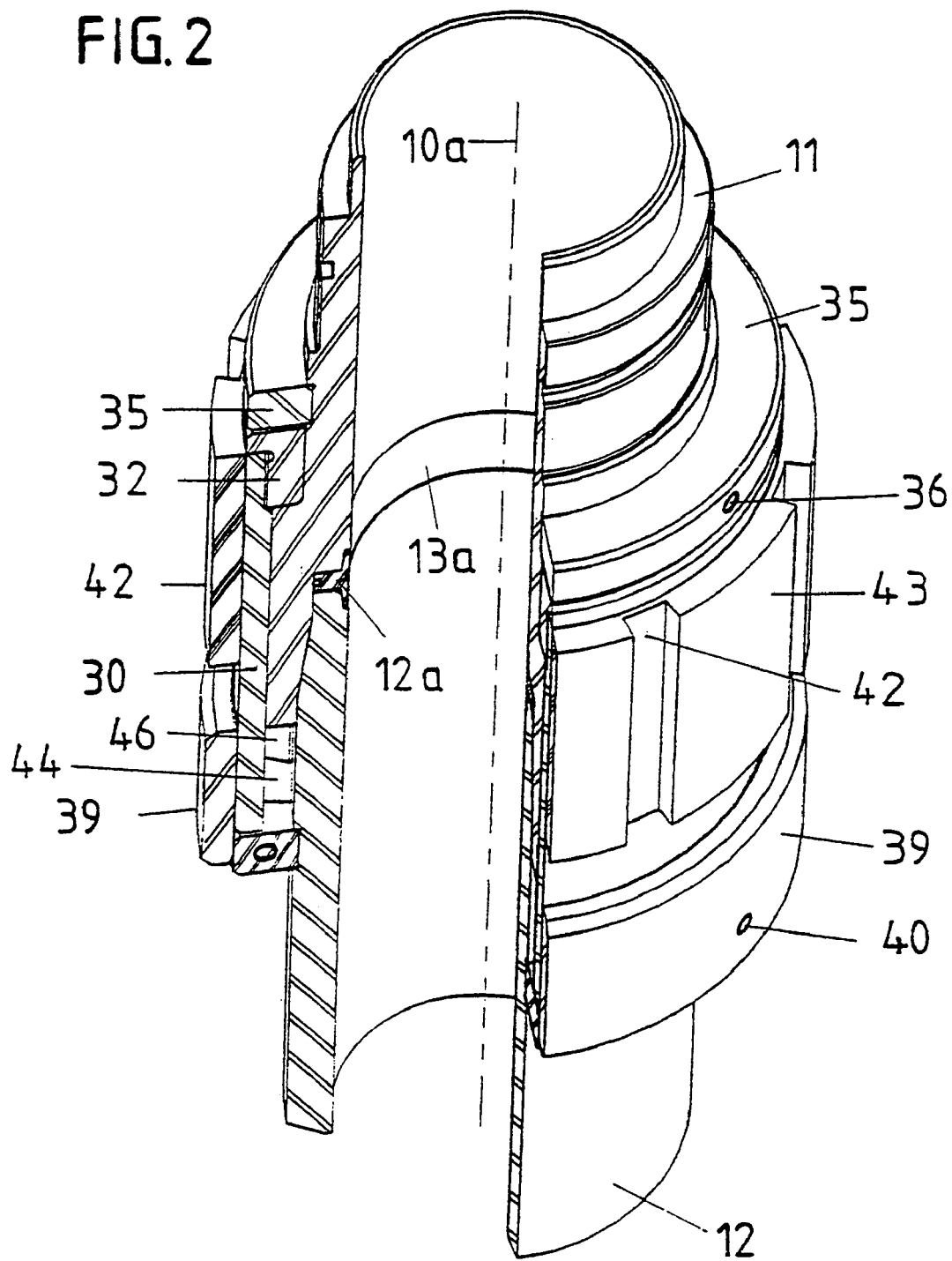
FIG. 2 shows the same as in FIG. 1, illustrated in perspective and partly in side view and partly in longitudinal section.
Figure 3:
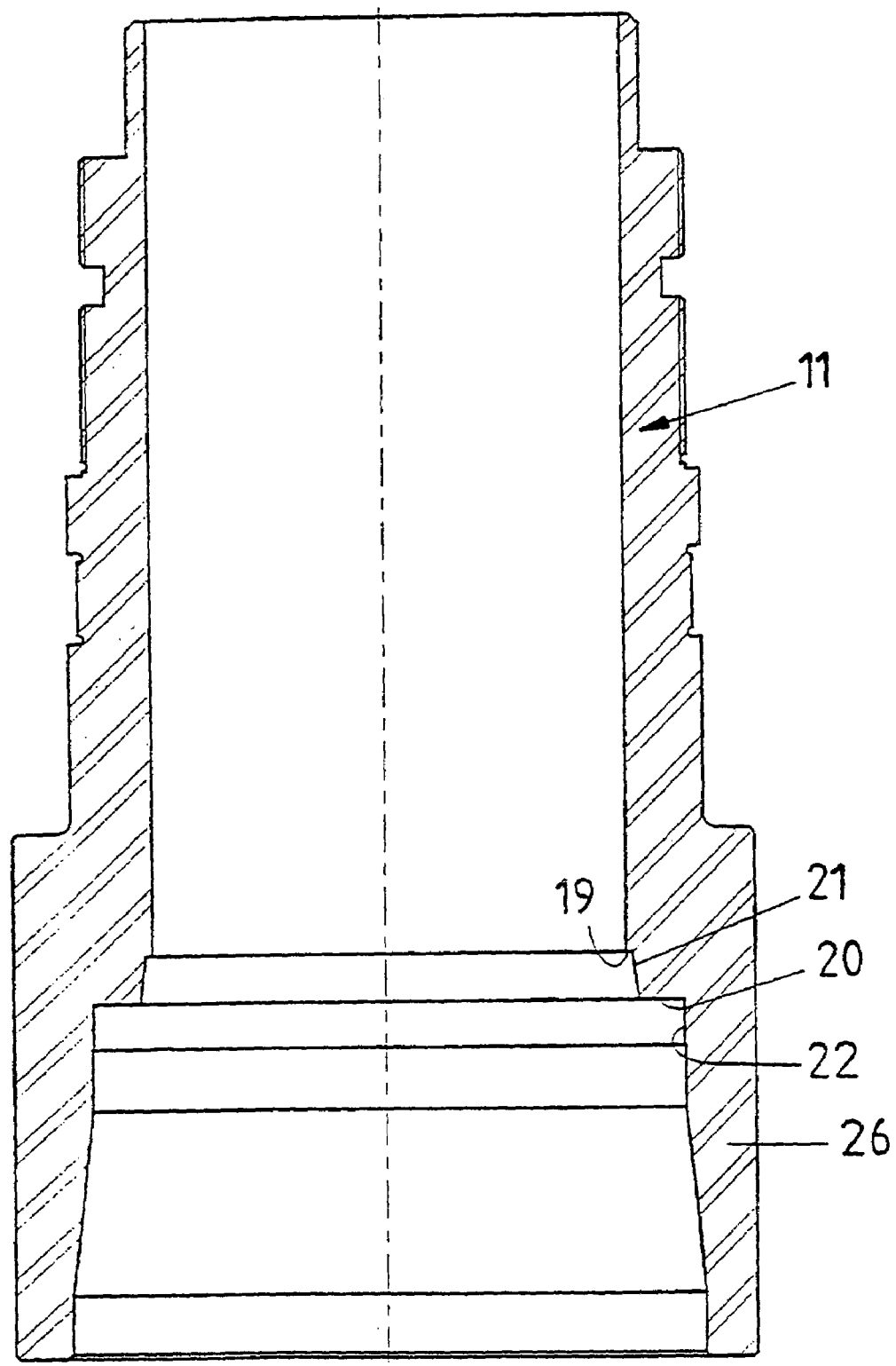
FIG. 3 shows a first armature member in longitudinal section.
Figure 4:
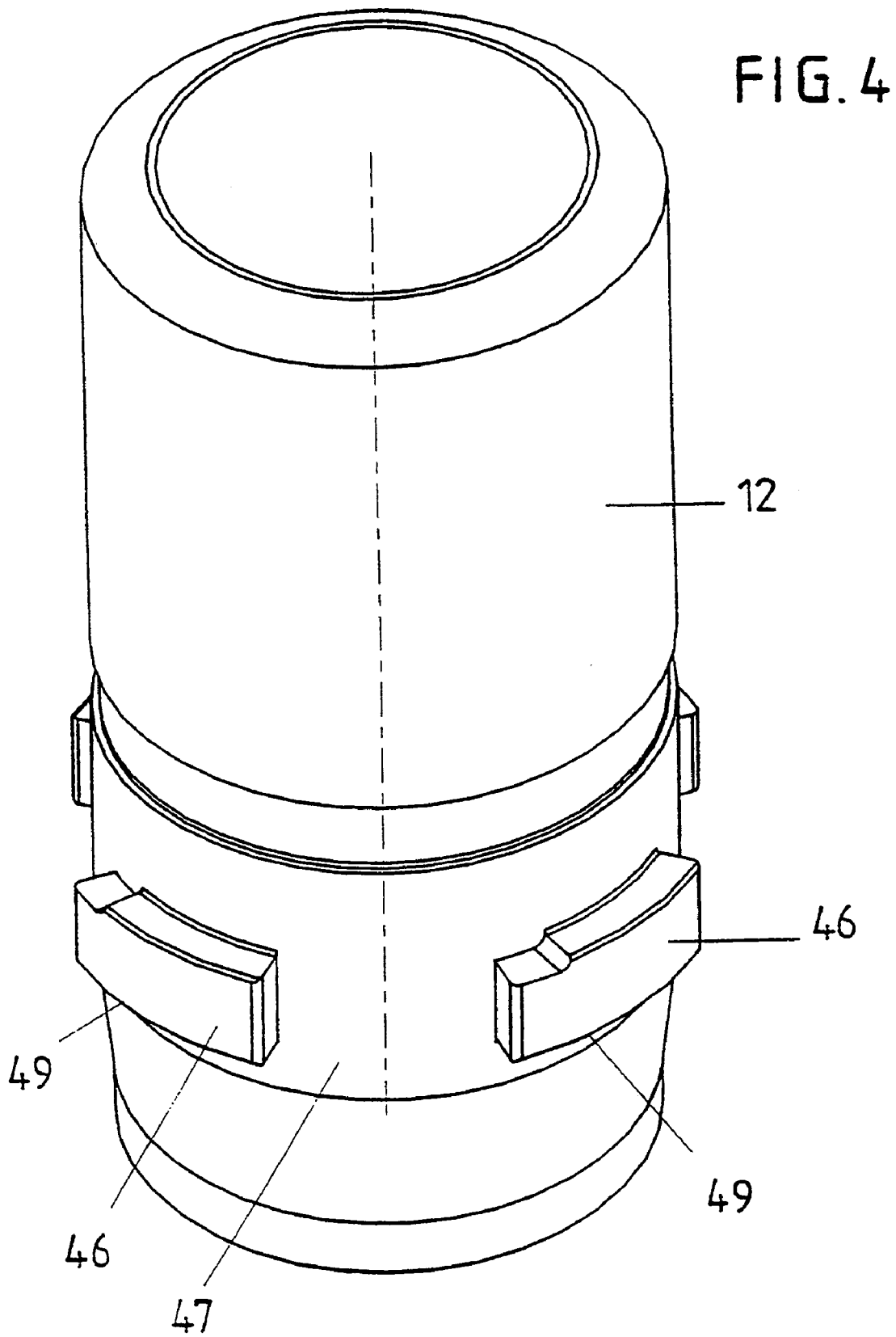
FIG. 4 shows a second armature member in perspective.
Figure 5:
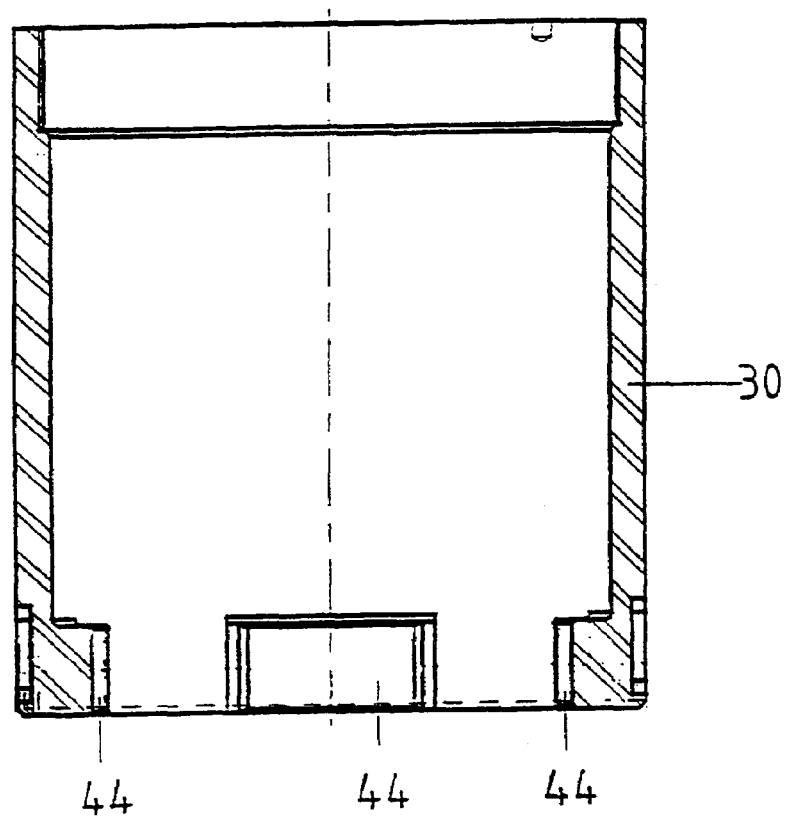
FIG. 5 shows a clamping member in longitudinal section
Figure 5A:
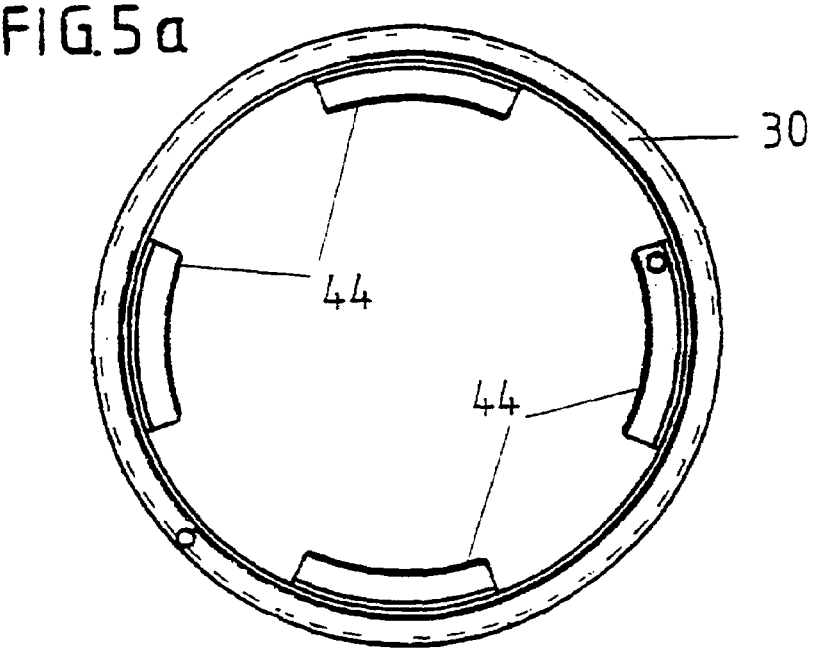
FIG. 5a shows the clamping member according to FIG. 5 in plan view.
Figure 8:
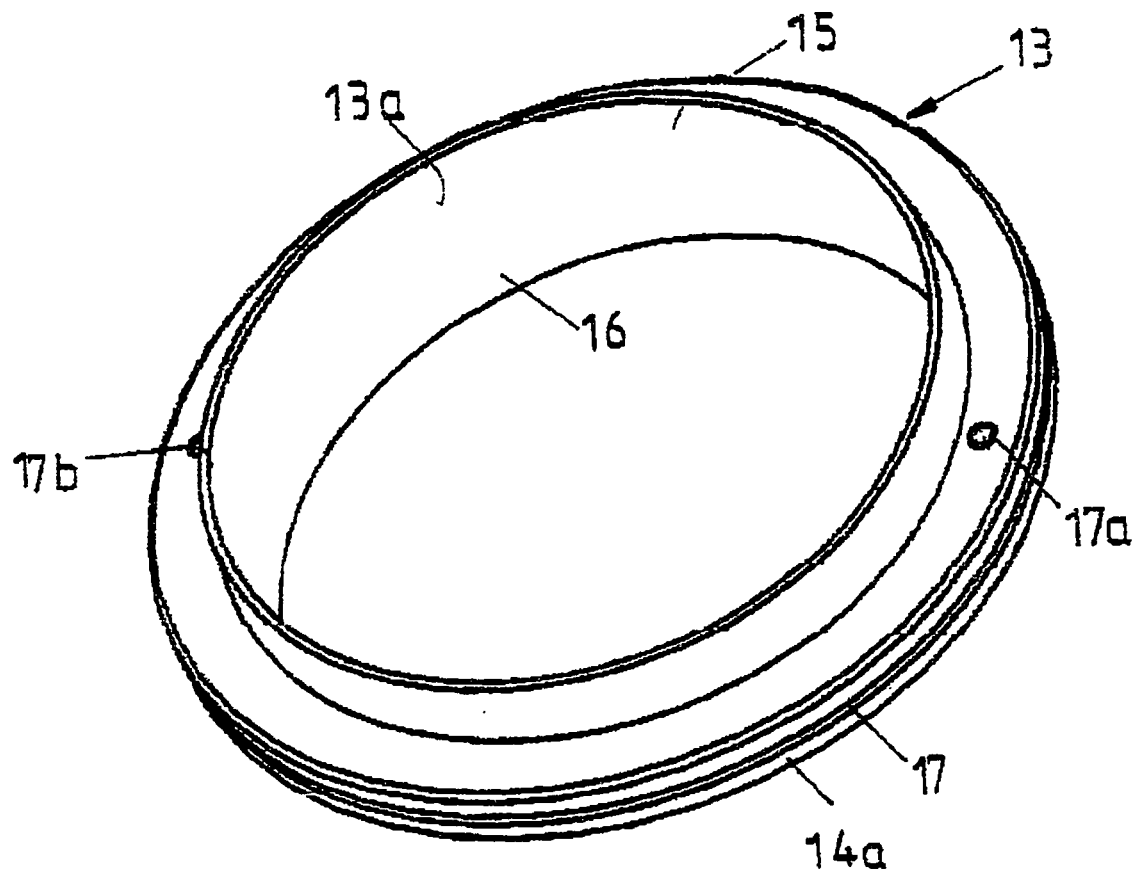
Figure 9:
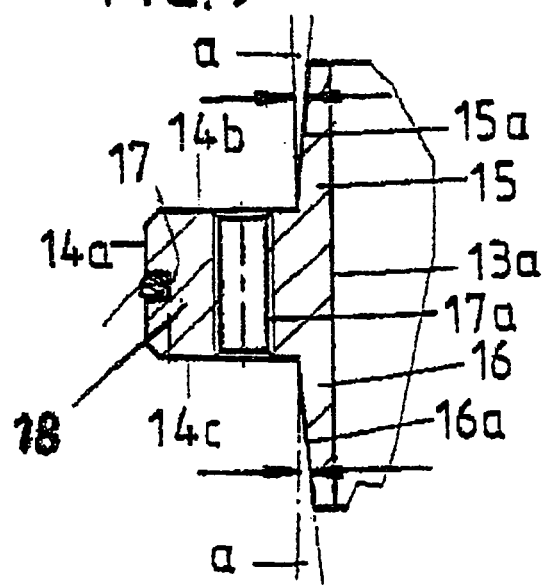
FIG. 9 shows a section of FIG. 6 on a larger scale.

In FIGS. 1 and 2 the clamping device 30 of the sealing arrangement 10 is shown designed with a sleeve-shaped clamping member 31, which is rotatably mounted via a collar portion 32, which projects inwardly into an annular groove 33 on the armature member 11. The annular groove 33 is defined between a shoulder portion 34 on the armature member 11 and a two-piece, stop-forming ring 35, which is locally fastened to the armature member 11 via radially extending fastening means 36.

In the use position of the sealing arrangement the end face 31a of the clamping member 31 is closed tightly up to an axially facing side face 37a of a two-part, stop-forming ring 37, which is locally fastened to the second armature member 12 in an associated annular groove 38 via radially extending fastening means (not shown further).

Along the lower outer side of the clamping member 31 there is fastened a cover member 39 via radially extending fastening means 40. By means of the cover member 39 a gap 41 can be sealed off between the clamping member 31 and the ring 37. Along the upper outer side of the clamping member 31 there is fastened to the clamping member 31 a sleeve-shaped hand grip portion 42 having projections 43 projecting radially outwards.

On the inner side (see FIG. 5) of the clamping member 31 there are arranged lowermost a series (four shown herein) of clamping means 44 projecting radially inwards, which are mutually separated by a corresponding number (four) of intermediate spaces 45.

On the outer side (see FIG. 4) of the armature member 12 there project radially outwards a series (four) of mutually separated clamping means 46, which are mutually separated by (four) intermediate spaces 47.

In the illustrated embodiment the clamping means 44 are provided with an axially facing, radially extending, elongate and plane clamping face 48.

The clamping means 46 are provided on their corresponding, axially facing clamping faces with an corresponding axially facing, radially extending, elongate and plane clamping face. In practice and as is shown in FIGS. 12a–12d the last-mentioned clamping face comprises a relatively short, radially extending wedge surface 49 and a following, considerably longer, radially extending support surface 50.

In sealing rings of steel, aluminium or other metal preferably mechanical clamping devices (not shown further) are employed in connection with the axial clamping together of the armature members 11, 12, while in addition the clamping device 30 is employed in order to rotate the clamping means 44, 46 (see FIGS. 12a–12d) into place in mutual locking positions (FIG. 12d).

In another case, where for example sealing rings of plastic are used, the clamping device 30 can be employed both for axial clamping together of the armature members 11, 12 and for locking together of the clamping means 44, 46. In the last-mentioned case the wedge face 49 is employed in connection with the clamping together of the armature members 11, 12.

In an introductory phase of the coupling together of the armature members 11, 12 (see FIG. 12a) the clamping member 31 is rotated relative to the armature members 11, 12 about the axis 10a, so that its clamping means 44 can be pushed axially inwards into the intermediate spaces 47 between the clamping means 46 of the armature member 12.

Thereafter the armature member 12 is pushed axially inwards into the armature member 11 and its clamping member 31, as is indicated by an arrow A in FIG. 12b.

The clamping member 31 is thereafter turned, as is shown by the arrow B in FIG. 12c, to the position which is shown in FIG. 12d. By means of the wedge face 49 the armature members 11, 12 are forced axially together from a position as shown correspondingly in FIG. 10 to a position as shown in FIG. 11.

In the last mentioned position the clamping means 46 of the armature member 12 and clamping means 44 of the clamping member 31 are secured in a mutual locking engagement via the plane clamping faces 48, 50. At the same time the armature members 11, 12 impact axially together via the stop faces 26c, 27c.

The members 11, 12, 31 are hereby secured axially in place relative to each other, while there is defined a degree of fit or other adjusted spacing between respective side faces 14b, 14c of the stem 14 and opposite guide faces 20, 23 of the armature members 11, 12.

There is hereby ensured an adjustment of the position of the stem 14 relative to the layer 11b and the layer 12b in an axial direction, while the sealing faces 15a and 16a are centered correspondingly in place in an axial direction relative to the conical support faces 21, 25 of the armature members 11, 12.

In the illustrated embodiment the sealing ring 13 forms a direct abutment only against the conical support face 21 of the armature member 11 and against the conical support face 25 of the armature member 12. The sealing ring 13 has a degree of fit or a larger or smaller spacing from opposite faces 19, 20, 22 of the layer 11b of the armature member 11 and from the guide face 23 of the layer 12b of the armature member 12.

The sealing ring 13, as shown separately in FIG. 6–9, has a substantially T-shaped cross-section with a middle stem 14 and two side wings 15, 16. The side wings 15, 16 are mutually connected via the middle stem 14 of the sealing ring in and at the inner face 13a.

The stem 14 is provided opposite the inner face 13a, with a cylindrical peripheral face/end face 14a. The end face 14a is adapted to form a slidable support surface for the sealing ring 13 along its periphery via the support face 22 of the armature member 11.

In the illustrated embodiment the cylindrical end face 14a of the sealing ring is provided with a central annular groove 17, which is designed to receive an elastically yielding O-ring 18, which projects radially just outside the end face 14a. The O-ring 18 can be utilised as the slide member of the sealing ring 13 during mounting in the armature and particularly for retaining the sealing ring 13 in a partially pushed in position, especially on mounting of the sealing ring 13 from below and upwardly into the downwardly opening layer 11b of the armature member 11.

The stem 14, which has a largely rectangular, rigid and compact cross-section, has from each respective end edge of the cylindrical end face 14a a radially extending, axially facing side face 14b and 14c respectively. In practice the side face 14b is arranged at a certain distance from the opposite guide face 20 of the armature member 11. Correspondingly the side face 14b is arranged at a certain distance from its opposite guide face 24. The distance between each side face/guide face pair can be minimal, that is to say in the degree of fit order of magnitude or at a certain distance, for example 1–3 mm in sealing rings having a relatively large diameter.

From one side face 14b of the stem 14 there projects laterally outwards a first sealing face in the form of a conical face 15a of the one side wing 15. From the other side face 14c there projects laterally outwards in the opposite direction a second sealing face in the form of a conical face 16a of the other side wing 16. The seal-forming conical faces 15a and 16a of the sealing ring 13 have equivalent dimensions and are designed symmetrically relative to the stem 14.

In the illustrated embodiment sealing faces 15a, 16a of the sealing ring 13 can have the same or substantially the same cone angle α as the respective opposite support faces 21, 25 of the armature members 11, 12. In such a case effective sealing is achieved by moderate axial displacement of the sealing wings 15, 16 of the sealing ring 13 along support faces 21, 25 of the armature members 11, 12 during exertion of a significant radial sealing pressure against the support faces 21, 25.

The sealing wings 15, 16 are provided with their respective radially extending, axially facing end face 15b, 16b. There are shown (see FIG. 11) end faces 15b, 16b of the side wings 15, 16 at a certain axial distance from the guide faces 19 and 23, so that the sealing wings 15, 16 can be moved along the conical faces 21, 25 axially a certain distance backwards and forwards relative to the faces 19 and 23 during expansion/contraction possibly occurring of the material of the sealing ring 13.

Furthermore in the illustrated embodiment the sealing ring 13 is provided, in diametrically opposite portions of the stem 14, with two axial through bores 17a, 17b including screw threads. The bores 17a, 17b are adapted to be passed through by a spindle having screw threads equivalent to the screw threads of the bores 17a, 17b in order to be able to force the stem 14 of the sealing ring axially away from the adjacent support face of the armature member on dismantling of the sealing ring after use, in the cases where the end face 14a on the stem 14 of the sealing ring 13 exhibits too great a friction against the cylindrical support face 21 of the armature member 11.

According to an alternative embodiment (see FIGS. 10 and 11), which can be employed for simple sealing arrangements, but which is preferred in sealing arrangements which are to be employed under high sealing pressures or under other particularly demanding sealing conditions, a sealing ring 13' has a cone angle b which is somewhat larger than the cone angle, a of the armature members 11, 12.

The pushing together of the armature members 11, 12 around the intermediate sealing ring 13' can in this instance take place in a corresponding manner as in the case which is described above. In FIG. 10 the sealing ring 13' is shown in an introductory phase of the pushing together between the armature members 11, 12 and in FIG. 11 the same is shown after ending the pushing together. The gaps between faces 14b, 14c of the sealing ring 13' and opposite faces 20, 23 of the armature members 11, 12 are shown according to FIG. 11 relatively large, but can in practice be considerably narrower, for example of a degree of fit order of magnitude.

In the illustrated embodiment the sealing ring forms, on the one side of the stem, a sealing abutment via the conical sealing face 15a of the sealing wing 15 against cone face 21 of the armature member 11, while the sealing ring 13, on the opposite side of the stem 14, forms a sealing abutment via conical sealing face 16a of the sealing wing 16 against the cone face 25 of the armature member 12.

In certain cases with simple sealing arrangements, the faces 14a, 14b and 15b, 16b of the sealing ring 13 can form direct support abutments against opposite faces 19, 20, 22 and 23, 24 of the armature members 11, 12.

In remaining cases, especially when the question is about sealing arrangements requiring more adjustment, the faces 14a, 14b, 15b and 14c and 16b of the sealing ring 13 can be arranged at a greater or smaller distance from said faces 19, 20, 22 and 23, 24, according to need. This case is indicated for example in the second embodiment according to FIGS. 10 and 11.

According to FIGS. 10 and 11 a sealing arrangement 10' according to the invention is shown having a sealing ring 13' according to an alternative construction.

A first departure from the first construction, which is illustrated according to FIGS. 1–9, consists in that prior to mounting the conical sealing faces 15a' and 16a' form a cone angle b, which differs from the cone angle a of the conical support faces 21, 25.

In that the cone faces 15a, 16a at the starting point, that is to say prior to mounting, form a cone angle b, which is somewhat larger than the equivalent cone angle a of the armature members 11, 12, the sealing wings 15 and 16 can during mounting be deformed elastically relative to the conical support faces 21, 25, so that the sealing faces 15a, 16a coincide with equivalent conical support faces 21, 25 of the armature members 11, 12 at a common cone angle a.

During installation of the sealing ring 13' in the armature member 12 the sealing face 15a forms in a first installation phase a minimal abutment against the cone face 25, while adjacent side face 14b of the stem 14 forms a significant space from the opposite face 20 of the armature member 12.

On pushing together the armature member 11 against the armature member 12 about the intermediate sealing ring 13, by means of the clamping device 30, from the position which is shown in FIG. 10 to the position which is shown in FIG. 11, the sealing wings 15',16' of the sealing ring 13' are deformed in an elastically yielding manner against the conical cone faces 21, 25 until the sealing faces 15a', 16a' form a tight abutment against the cone faces 21, 25. In a position corresponding to that which is shown in FIG. 1, the conical sealing faces 15a, 16a form the same cone angle a as the cone faces 21, 25 of the armature members 11, 12, as is shown in FIG. 11.

By arranging for a certain degree of fit between end face 14a of the sealing ring 13' and support face 22 of the armature member 11 one can ensure that the stem 14 of the sealing ring can make a certain axial adjustment if necessary and be centered in place in a middle position between the armature members 11, 12, as is illustrated in FIG. 11. In this connection, without this being specifically illustrated in the drawing, larger or smaller spaces can be employed between the faces 14b, 22 and between the faces 14c, 24, according to need.

In the construction according to FIGS. 10 and 11 provision is made, as an extra, alternative possibility, for a respective portion of the sealing face 13a' of the sealing wings 15', 16' to have prior to mounting a conical outline at a cone angle b, so that said portions of the sealing face 13a' receive after mounting, that is to say after the sealing wings 15',16' are elastically deformed relative to the support faces 21, 25 a flush outline with the guide surfaces 11a, 12a of the armature members 11, 12.

In the construction according to FIGS. 10 and 11 an endwise support abutment is employed between the armature members 11, 12 via radially extending support faces 20', 25' instead of the support abutment between the cone faces 26c, 27c of the first embodiment.

What is claimed is:

1. A sealing arrangement (10, 10') comprising:
   first and second separate armature members (11, 12), said armature members being fitted one within the other along conical contact surfaces (26a, 27a),
   a sealing ring (13, 13') interposed between said first and second armature members, and
   a clamping means (30) for clamping the armature members (11, 12) against each other, said sealing ring (13, 13') having a substantially T-shaped annular cross-section and including first and second sealing wings (15, 16) extending in opposite axial directions, each of the sealing wings (15, 16) including a radially outwards facing sealing face (15a, 16a), and a central, rigid stem (14) between the sealing wings (15, 16) and extending radially outwards thereof,
   each of the sealing faces (15a, 16a) being conically shaped to be supported against a radially surrounding, correspondingly conically shaped, intermediate, stop-forming, gliding and support face (21, 25) of a respective armature member,
   each of the intermediate conical support faces (21, 25) of the armature members (11, 12) extending at a first cone angle (a),
   the sealing face of each of the sealing wings (15, 16) extending at a second cone angle (b) greater than the cone angle (a) of the intermediate, stop-forming, conical support faces (21, 25) of the armature members (11, 12) prior to mounting, and after mounting extending at said first cone angle (a) to form a tight sealing abutment against the corresponding intermediate, stop-forming, conical support face (21, 25), wherein the entire rigid stem (14) and the first sealing wing (15) are seated in the first armature member (11), and the second sealing wing (16) is seated in the second armature member (12),
   wherein in the first armature member (11), a first side face (14b) of the stem (14) is seated in an axially facing, outermost guide surface (20), an end face (14a) of the stem (14) is seated in a radially facing cylindrical, outermost lying support face (22), and the first sealing wing (15) of the sealing ring (13, 13') is seated in one of the intermediate, stop-forming, conical support faces (21), and, in the second armature member (12), a second side face (14c) of the stem (14) is seated in another axially facing, outermost guide surface (24), and the second wing (16) of the sealing ring (13, 13') is seated in the other intermediate, stop-forming, conical support face (25),
   wherein the outermost lying support face (22) extends continuously in axial direction and solely in one of the armature members (11, 12), the outermost lying support face (22) being smooth to provide a continuous gliding support surface for the end face (14a) of the stem (14) directly against the outermost lying support face (22),
   wherein the first side face (14b) and the second side face (14c) of the stem (14) are dimensioned relative to the corresponding outermost guide surfaces (20, 24) so as to be spaced at a distance from the corresponding outermost guide surfaces (20, 24) after mounting.

2. The arrangement as claimed in claim 1, wherein each of the sealing wings (15, 16) has, in a radial direction, a small cross-sectional dimension, increasing from a minimum at an outer end portion to a maximum at an inner end portion proximate the stem (14), and each of the sealing wings (15, 16), in an axial direction, has a large cross-sectional dimension, to obtain support of the sealing wings (15, 16) along a major area of the respective intermediate conical support face (21, 25), both of the cross-sectional dimensions being relatively larger in respect of the cross-sectional dimensions of the stem (14), in the axial as well as in the radial direction to provide a rigid stem (14).

3. The arrangement as claimed in claim 1, wherein the clamping means (30) comprises two radially directed, mutual overlapping armature member portions (26, 27) extending radially outside of the sealing ring (13, 13'), and a controlled, stop-forming abutment between the armature members (11, 12) formed by the armature member portions (26, 27), supporting each other along the mutually opposite conical contact surface (26a, 27a) extending obliquely with respect to a central axis of the sealing arrangement.

4. The arrangement as claimed in claim 3, wherein during use, a controlled gliding movement in the sealing arrangement is provided by the combination of the oblique extension of the mutually overlapping, stop forming armature member portions (26, 27) and the elastically deformable wings (15, 16) of the sealing ring (13, 13').

5. The arrangement as claimed in claim 1, wherein each of the sealing faces (15a, 16a) of said sealing ring (13, 13') has the same axial extension as that of the associated sealing wing (15, 16), each of the sealing faces (15a, 16a) has a continuous, rectilinear extension in an axial direction of the associated sealing wing (15 16), and each of the sealing faces (15a, 16a) tapers in an axial direction from the stem (14) and is elastically deformable in relation to the stem (14), in order to secure a controlled elastic deformation of the sealing wings (15, 16).

6. The arrangement as claimed in claim 1, wherein the distance between the first and second side faces (14b, 14c) and the corresponding outermost guide surfaces (20, 24) is 1–3 mm.

7. The arrangement as claimed in claim 1, wherein the sealing ring (13, 13') has end sealing faces (15b, 16b) at ends of the sealing wings (15, 16), the armature members (11, 12) have end support faces (19, 23) facing the end sealing faces (15b, 16b).

8. The arrangement as claimed in claim 7, wherein the end sealing faces (15b, 16b) are dimensioned relative to the corresponding end support faces (19, 23) so as to be spaced at a distance from the end support faces (19, 23) after mounting.

9. A sealing arrangement (10, 10') comprising:
   first and second separate armature members (11, 12), said armature members being fitted one within the other along conical contact surfaces (26a, 27a),
   a sealing ring (13, 13') interposed between said first and second armature members, and
   a clamping means (30) for axially clamping the conical contact surfaces of the armature members (11, 12) against each other,
   said sealing ring (13, 13') having a T-shaped cross-section and including first and second sealing wings (15, 16) extending in opposite axial directions, and a stem (14) extending radially outwards thereof between the sealing wings (15, 16), each of the sealing wings (15, 16) having a radially outwards facing sealing face (15a, 16a) and an end face (15b, 16b) extending radially from the sealing face (15a, 16a), the stem (14) having side faces (14b, 14c) adjacent to the first and second sealing wings (15, 16) and an end face (14a) between the side faces (14b, 14c), said first and second armature members being axially slidable on one another along said contact surfaces (26a, 27a) to a mounting position to sealingly secure the sealing ring each of the first and second armature members (11, 12) having an axially facing, outermost guide surface (20, 24) facing a respective one of the side faces (14b, 14c) of the stem, a conical support face (21, 25) for forming a tight sealing abutment against one of the sealing faces (15a, 16a) of the sealing wings after said armature members reach said mounting position, and an axially facing end guide surface (19, 23) facing one of the end faces (15b, 16b) of the sealing wings, one of the first and second armature members (11, 12) further having a smooth outermost lying support face (22) extending continuously in axial direction and providing a continuous gliding support surface for the entire end face (14a) of the stem (14) directly against the smooth outermost lying support face (22).

10. The arrangement as claimed in claim 9, wherein the side faces (14b, 14c) are dimensioned relative to the corresponding outermost guide surfaces (20, 24) so as to be spaced at a distance from the corresponding outermost guide surfaces (20, 24) after mounting.

11. The arrangement as claimed in claim 10, wherein the space between the side faces (14b, 14c) and the corresponding outermost guide surfaces is 1–3 mm after mounting.

12. The arrangement as claimed in claim 9, wherein the end faces (15b, 16b) are dimensioned relative to the corresponding end guide faces (19, 23) so as to be spaced at a distance from the corresponding end guide faces (19, 23) after mounting.

13. The arrangement as claimed in claim 9, wherein the smooth outermost lying support face (22) is of cylindrical shape.

14. The arrangement as claimed in claim 13, wherein said smooth outermost lying face (22) of cylindrical shape merges with the conical sliding surface (27a) of the respective armature member.

15. The arrangement as claimed in claim 9, wherein said first and second armature members are relatively axially movable and have slidable contact surfaces (26a, 27a) which are conical so that as the armature members move axially and slide on one another, the contact surfaces (20, 24) travel axially and radially relative to one another.

16. The arrangement as claimed in claim 15, wherein said armature members are in the form of pipe couplings.

17. The arrangement as claimed in claim 15, wherein said clamping means applies axial pressure to cause said armature members to engage said conical surfaces thereof against one another.

18. The arrangement as claimed in claim 9, wherein said sealing ring and said armature members are made of the same material.

* * * * *